United States Patent [19]

Johnson et al.

[11] 4,076,847

[45] Feb. 28, 1978

[54] TEA-COLORED FLAVOR GRANULES

[75] Inventors: Richard Shaw Johnson, Irby; John Kenneth Potter, Bromborough, both of England

[73] Assignee: Thomas J. Lipton, Inc., Englewood Cliffs, N.J.

[21] Appl. No.: 735,136

[22] Filed: Oct. 26, 1976

[30] Foreign Application Priority Data

Oct. 24, 1975 United Kingdom ............... 43848/75

[51] Int. Cl.² ............................................... A23F 3/00
[52] U.S. Cl. ......................................... 426/78; 426/96; 426/289; 426/293; 426/295; 426/593; 426/594; 426/597
[58] Field of Search ...................... 426/89, 93, 96, 103, 426/597, 77, 78, 289, 293, 295, 593, 594

[56] References Cited

U.S. PATENT DOCUMENTS

| 2,224,942 | 12/1940 | Weisman | 426/93 X |
|---|---|---|---|
| 2,868,646 | 1/1959 | Schapiro | 426/96 |
| 3,385,710 | 5/1968 | Reymond et al. | 426/96 X |
| 3,535,119 | 10/1970 | Klein et al. | 426/96 X |
| 3,660,115 | 5/1972 | Revie | 426/96 |
| 3,689,290 | 9/1972 | Blackstock et al. | 426/96 X |
| 3,819,838 | 6/1974 | Smith et al. | 426/89 |
| 3,914,439 | 10/1975 | Graves | 426/78 |
| 3,956,511 | 5/1976 | Mitchell et al. | 426/89 X |
| 3,971,852 | 7/1976 | Brenner et al. | 426/89 X |
| 3,985,913 | 10/1976 | Johnson et al. | 426/96 X |

FOREIGN PATENT DOCUMENTS 1,204,578 9/1970 United Kingdom ................ 426/597

*Primary Examiner*—Steven L. Weinstein
*Attorney, Agent, or Firm*—Barry Kramer

[57] ABSTRACT

Beverage compositions comprise flavor granules coated on the outer surface with a powdered beverage such as tea, cocoa or coffee, preferably prepared by coating the flavor granules in a rotating granulator.

7 Claims, No Drawings

TEA-COLORED FLAVOR GRANULES

BACKGROUND OF THE INVENTION

This invention relates to beverage compositions, more particularly to flavoured beverage compositions.

The term beverage used in this specification and claims is defined as a drink prepared by infusing a vegetable product derived from a leaf or bean and includes products such as tea, coffee, cocoa, blackcurrant, jasmine and herb teas.

This invention is concerned with the flavouring of such beverages. Public taste for new beverages and for cheaper forms of existing ones exists and this invention provides a means of producing beverages with a flavour which contrasts with or enhances that of the vegetable product on which the beverage is based. The invention also provides new beverage compositions.

It is desirable that the beverage composition provided by this invention appears to be similar to the beverage as normally used.

SUMMARY OF THE INVENTION

This invention provides a beverage composition comprising flavour containing granules coated on the outer surface with a powdered beverage.

The invention also provides a process for the preparation of these beverage compositions comprising preparing flavour containing granules and coating the granules in a rotating granulator with a powdered beverage to give the granules the colour of the beverage as normally used.

DETAILED DESCRIPTION OF THE INVENTION

The flavour granule which is conveniently water soluble normally has a particle size between 0.5 and 2 mm and can be prepared by granulation or spray drying, followed by granulation or any other appropriate means. The basis of the granule is normally a long chain polysaccharide such as dextrose, gum acacia or other appropriate carrier material. Preferably the carrier material is one which has an adequate solubility in water, together with good flavour retention properties and gum acacia is a preferred carrier material. The desired quantity of flavour is incorporated into the flavour granule and this is usually in the range 2 to 10% by weight. By carrying the flavour is a suitable carrier the flavour is retained better in storage than if it is applied to the actual beverage leaf or powder. If the flavour granules are of insufficient size they may be granulated prior to coating with the beverage powder conveniently in a rotating pan or drum granulator.

Any appropriate flavour which can be incorporated and effectively retained in the granule until the beverage composition is dissolved for consumption can be used.

Suitable flavours include essential oils such as bergamot, lemon, lime or orange in the natural or determinated state. Equally these essential oils can be combined with appropriate nature-identical chemicals. Flavours compounded from nature-identical chemicals to produce jasmine, rose, lemon, orange or blackcurrant flavours can also be used. Flavours useful to enhance the flavour of the coated beverage include tea oils, synthetic tea flavours, chocolate flavours and coffee flavours.

In addition, antioxidants as allowed by appropriate national laws can be included, such as butylated hydroxy anisole and butylated hydroxy toluene.

If the flavour granules are to be mixed with other components, they are preferably made to have a size similar to that of the bulk of the other components with which they are to be mixed. This procedure avoids problems which can arise from settlement during transport or storage. Such settlement may result in higher concentrations of one component in a particular part of the package of material and this could result in too high a flavour concentration in part of the package which would be unacceptable to the user.

The coating of the granules with the powdered beverage can be carried out in a rotating drum or pan granulator and water or a solution of the granule material, such as gum acacia, can be used to bind the coating of powdered beverage to the granules. When a solution is used to aid in the granulation, the coated granules produced are stronger than those produced using water. This can be of benefit when the granules are to be subjected to mechanical handling, for example in packaging equipment. The coated granules, after formation, should be dried to have at most 12% by weight of water to ensure adequate storage stability.

The present invention is of particular value in relation to problems which have arisen in meeting demand for flavoured teas, such as lemon tea and bergamot tea. Difficulty has been experienced in incorporating, in a stable form, flavouring compositions into teas, ready for mixing with water, prior to infusion and development of the full flavour, together with a modifying flavour. Such flavoured teas can conveniently be packed in tea bags, in which case care must be taken to ensure that the flavouring additive remains within the tea bag and does not detract from the appearance of the tea in the bag, or, alternatively, if the tea is used out of tea bags, the tea does not have a speckled, non-uniform appearance, due to the presence of flavouring granules which are dissimilar in appearance from tea.

Clearly, various dyestuffs could be used to colour the flavouring granules but, in many countries, such additions to a tea composition would not be acceptable and, furthermore, they may introduce bad ("off") flavours to the tea.

In a preferred form, the present invention provides a process for the preparation of appropriately coloured flavour granules suitable for inclusion in bulk tea or tea in tea bags which does not introduce any off-flavours, nor does it comprise any non-tea colour additions to the composition.

Accordingly, the present invention provides also a tea-coloured flavour granule comprising a flavour carried in a flavour carrier, coated on its outer surface with tea powder having a particle size in the range 45 to 250 microns, preferably having less than 12% by weight of particles less than 45 microns.

It has been found that when tea powder of very small particle size, such as below 40 microns, is applied to the granules the colour of the coated granules is significantly lighter than that of the same tea in normal broken leaf form. If tea powder of larger than about 300 microns is employed, difficulty is experienced in obtaining a uniform adherent coating.

This invention also provides a tea composition comprising broken leaf tea and a flavour modifying quantity of a beverage composition provided by this invention consisting of a tea contrasting flavour granule coated with a tea powder having a particle size in the range 45 to 250 microns.

This invention also provides a tea bag comprising such a tea composition.

The tea bags may be made using orthodox equipment and the beverage composition has been found to have sufficient strength to withstand mechanical handling involved. In addition, the beverage granules are not readily discernible in the tea compositions because of their similarity in colour to the broken tea leaf from which the tea drink is normally brewed.

The beverage compositions provided by the various aspects of this invention may be mixed with water or milk, as appropriate, to provide a drink having an attractive modifying or contrasting flavour to the basic beverage. Alternatively, by using appropriate flavours the quantity of the expensive basic beverage may be reduced and a palatable drink provided using less of the natural vegetable product beverage than would otherwise be required.

EXAMPLE I

2 Kg of spray-dried granules or prills of gum-acacia containing 8½% by weight bergamot oil and of particle size <50 μ were added to a rotating pan granulator of diameter 500 mm which is operated at an angle of 30° to the horizontal and at a rotational speed of 22 rpm. Water was carefully sprayed into the pan granulator until the prills had granulated to give granules of particle size 0.1 to 0.5 mm. The granules were then discharged and dried in an oven drier at 50° C for 30 minutes.

The dried granules were returned to the pan granulator and 2 kg of tea powder, previously milled to give a particle size distribution of 14% less than 45 microns, 58% 45 to 150 microns and 28% 150 to 250 microns, was added to the granules in the granulator at a rate of about 200 g per minute. During the addition, a light spraying of aqueous gum-acacia solution of concentration 20% w/w was applied to the granulator. About 1.2 liters of solution were added in total and this process gave granules of substantially the same colour as bulk leaf tea. The granules were then discharged and dried in an oven drier at 50° C for 30 minutes so that their final water content was below 12%.

EXAMPLE II

A mixture of 2 kg of spray-dried gum-acacia containing 20% by weight lemon oil and 0.92 kg of anhydrous citric acid, both of particle size <50 μ, were charged to a rotating pan granulator of diameter 500 mm which is operated at an angle of 30° to the horizontal and a rotational speed of 22 rpm. Water was sprayed into the pan granulator until the powder had granulated to give granules of particle size 0.1 to 0.5 mm, about 350 ml of water being added. 2.2. kg of milled tea of the same particle size distribution as in Example I was then added to the granules in the granulator at a rate of about 200 g per minute and, as before, granulation was continued spraying on aqueous gum-acacia of concentration 20% w/w, about 1.2 liters being added. The granules were then discharged and dried in an oven at 50° C for one hour, so that their final water content was below 12%. The appearance of the granules matched the tea with which they were to be mixed.

Further work was done in an aluminium pan 23 inches (584 mm) diameter and 15 inches (381 mm) deep having a fixed speed of 20 rpm and at an angle of 30° to the horizontal.

EXAMPLE III 5.0 kilos of spray dried granules of gum-acacia containing 7% bergamot flavour, with a particle size of less than 50 microns were added to the pan. Water was carefully sprayed onto the material in to pan granulator until the granules had a particle size of 0.1 to 0.5mm.

5.0 kilos of tea powder (previously milled to give a particle size distribution of 25% less than 150 microns, 50% 150 to 250 microns, 25% more than 250 microns) and 2.5 kilos of 20% w/w gum-acacia solution were added concurrently over a period of 20 minutes to give granules of substantially the same colour as bulk leaf tea.

The granules were discharged and dried at 70° C for 1¼ hours until the water content was below 12%.

EXAMPLE IV

Using the same equipment as employed in Example III, a coffee-based beverage comprising a coffee flavour was prepared. Flavour granules were prepared using gum-acacia and a standard coffee flavour based on benzaldehyde, diacetyl, dimethyl sulphide, fenugreek, furfuraldehyde, furfuryl mercaptan, guaicol, methyl cyclopentenolone, propenyl guiathol and pyridine. The flavour content of the granules was 4% by weight. 2½ kilos of the spray dried coffee-flavoured granules were further granulated with 0.5 kilos of water to an average particle size of 0.8 mm. These flavour granules were then coated with 2½ kilos of ground coffee using 1.65 kilos of a 20% gum-acacia solution to aid in the coating. The coated granules were dried for 1.25 hours at 70° C and had a moisture content of approximately 10%. On dissolving these coated granules in hot water a pleasant coffee-flavoured beverage resulted.

EXAMPLE V

A cocoa-flavoured beverage composition was prepared using the same apparatus as employed in Example III. 2.5 kilos of a gum-acacia based granule containing 5% of a standard chocolate flavour containing acetaldehyde, benzaldehyde, diacetyl, dimethyl sulphide, furfuraldehyde, pyridine, phenyl acetic acid, iso valeraldehyde and vanillin. These spray dried granules were further granulated with 0.48 kilos of water to produce a particle in the range 0.1 to 0.5 mm and these particles were coated with 0.9 kilos of cocoa powder using 1 kilo of a 20% aqueous gum-acacia solution. The coated particles were dried for 1.25 hours at 70° C and had a residual moisture content of less than 10%.

EXAMPLE VI

Leaf tea of particle size suitable for use in a tea bag was mixed with 10% by weight of the beverage granules prepared in accordance with Example II. The leaf tea and the granules were thoroughly mixed and fed into a tea bagging machine to produce tea bags containing leaf tea and tea coloured lemon flavoured beverage granules. Tea brewed from these tea bags produced a palatable beverage having an attractive lemon flavour.

What is claimed is:

1. Tea-colored flavor granules adapted to blend uniformly with broken leaf tea comprising water soluble granular carriers, each having a particle size between 0.5 and 2 mm and each containing from 2 to 10% by weight of an extrinsic flavor incorporated therein, each of said carriers being coated with tea powder which, upon infusion, together with said broken leaf tea, forms a beverage which is enhanced by or contrasted with the flavor contained in said carrier, said tea powder having a particle size in the range of 45 to 250 microns.

2. A beverage composition as claimed in claim 1, in which the flavour in the granule contrasts with the flavour of the powdered beverage coating.

3. A beverage composition as claimed in claim 1 in which the flavour in the granule enhances the flavour of the powdered beverage coating.

4. A process for preparing tea-colored flavor granules as claimed in claim 1, comprising preparing water soluble flavour-containing granules having a particle size between 0.5 and 2 mm and coating the granules in a rotating granulator with powdered tea having a particle size in the range of 45 to 250 microns, to impart to the granules the colour of the beverage as normally used.

5. A process as claimed in claim 4 in which the powdered tea is applied to the granule using an aqueous solution of a granule material.

6. A tea composition comprising broken leaf tea and tea-colored flavor granules as claimed in claim 1 in which the flavour is a tea contrasting flavour.

7. A tea bag comprising a tea composition as claimed in claim 6.

* * * * *